United States Patent [19]

Nishimura et al.

[11] Patent Number: 4,640,592
[45] Date of Patent: Feb. 3, 1987

[54] OPTICAL DISPLAY UTILIZING THERMALLY FORMED BUBBLE IN A LIQUID CORE WAVEGUIDE

[75] Inventors: Yukuo Nishimura, Sagamihara; Toshiaki Asano; Nobutoshi Mizusawa, both of Yokohama; Eigo Kawakami, Kawasaki; Masahiro Haruta, Funabashi; Takashi Noma, Tokyo; Hiroshi Takagi, Yokohama; Mitsunobu Nakazawa; Kunitaka Ozawa, both of Tokyo, all of Japan

[73] Assignee: Canon Kabushiki Kaisha, Tokyo, Japan

[21] Appl. No.: 570,810

[22] Filed: Jan. 16, 1984

[30] Foreign Application Priority Data

Jan. 22, 1983 [JP] Japan ................................. 58-8873
Jan. 22, 1983 [JP] Japan ................................. 58-8874
Jan. 22, 1983 [JP] Japan ................................. 58-8875
Jan. 22, 1983 [JP] Japan ................................. 58-8876

[51] Int. Cl.$^4$ .................. G02B 6/20; G09G 3/04; G09F 13/00; F21V 7/04
[52] U.S. Cl. .................. 350/96.32; 350/96.30; 350/96.34; 350/96.10; 350/96.24; 350/363; 340/758; 340/771; 358/901; 40/547; 362/32

[58] Field of Search ............... 350/96.10, 96.24, 96.29, 350/96.30, 96.32, 96.34, 363, 312; 362/32; 315/169.3, 169.4; 40/544, 546, 547, 406, 407, 408; 337/18; 340/758, 721; 358/901

[56] References Cited

U.S. PATENT DOCUMENTS

| | | | |
|---|---|---|---|
| 3,612,653 | 10/1971 | Rajchman | 350/363 |
| 3,653,739 | 4/1972 | Strack | 350/96.15 |
| 4,195,907 | 4/1980 | Zamja et al. | 350/96.10 |
| 4,422,719 | 12/1983 | Orcutt | 350/96.30 |
| 4,466,697 | 8/1984 | Daniel | 350/96.30 |
| 4,519,017 | 5/1985 | Daniel | 362/32 |

FOREIGN PATENT DOCUMENTS

1558404 1/1980 United Kingdom ............. 350/96.32

*Primary Examiner*—William L. Sikes
*Assistant Examiner*—Brian M. Healy
*Attorney, Agent, or Firm*—Fitzpatrick, Cella, Harper & Scinto

[57] ABSTRACT

An optical device comprises an optical waveguide having, as a basic unit, a core layer of a liquid having a relatively high refractive index and a clad layer having a relatively low refractive index and covering said core layer, and a heat-generating means for heating a part of said core layer to form a vapor bubble in said liquid of said core layer.

9 Claims, 15 Drawing Figures

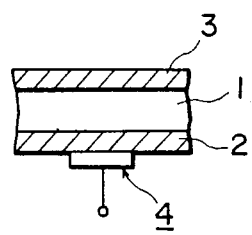
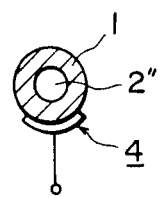
FIG. 2A          FIG. 2B
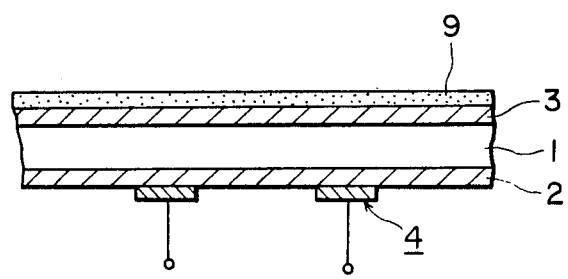
FIG. 3
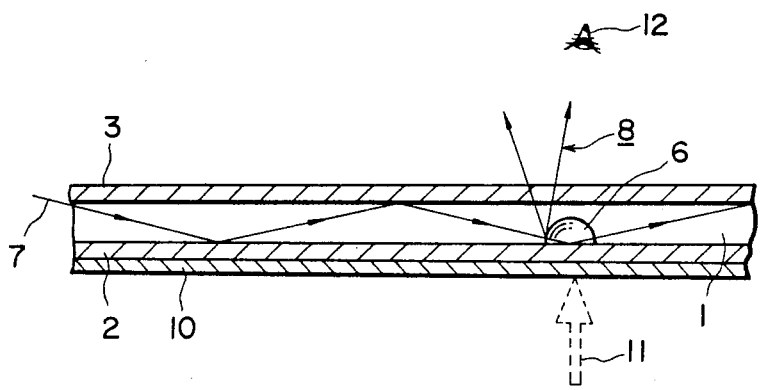
FIG. 4

OPTICAL DISPLAY UTILIZING THERMALLY FORMED BUBBLE IN A LIQUID CORE WAVEGUIDE

BACKGROUND OF THE INVENTION

1. Field of the Invention

The present invention relates to a novel optical device and, more particularly, to an optical device adapted for light modulation or display, to an optical apparatus using the same, and to a method of operating the same.

2. Description of the Prior Art

Cathode-ray tubes (CRTs) are widely used as displays of terminal displays of office equipment or measuring equipment, or as displays of television or VTR monitors. However, such a CRT still has problems of low image quality, low resolution, and small display capacity as compared to those of a hard copy produced by silver salt or by electrophotography.

As a substitute for a CRT, a liquid crystal panel which has a liquid crystal in a dot matrix format is known as a display. However, a liquid crystal display which satisfies the requirements of drivability, display performance, reliability, productivity, and durability has not yet been devised. An optical shutter utilizing a liquid crystal light bulb is receiving attention as an optical modulator.

Such a device is disadvantageous in that a complex and expensive optical system is required.

SUMMARY OF THE INVENTION

It is an object of the present invention to provide an optical device which is free from the problems of the prior art optical devices and which realizes a simple light modulation apparatus or display apparatus without requiring a complex and expensive optical system; and also to provide an optical apparatus using the same and a method of operating the same.

It is another object of the present invention to provide an optical device which has excellent drivability, reliability, productivity, durability, and so on; and also to provide an optical apparatus using the same and a method of operating the same.

It is still another object of the present invention to provide an optical device which allows formation of an image of good quality and high resolution, an optical apparatus using the same, and a method of operating the same.

According to the present invention, there is provided an optical device comprising an optical waveguide having, as a basic unit, a core layer of a liquid having a relatively high refractive index and a clad layer having a relatively low refractive index and covering said core layer, and a heat-generating means for heating a part of said core layer to form a vapor bubble in said liquid of said core layer.

BRIEF DESCRIPTION OF THE DRAWINGS

FIGS. 2A and 2B are schematic cross-sectional views of the optical device shown in FIGS. 1A and 1B;

FIG. 3 is a schematic sectional view of an optical device in which a light diffusion layer is formed on the optical device shown in FIGS. 1A and 1B;

FIG. 4 is a schematic sectional view for explaining another principle of operation of an optical device according to the present invention as a light modulation device or display device;

DETAILED DESCRIPTION OF THE PREFERRED EMBODIMENTS

The preferred embodiments of the present invnetion will now be described with reference to the accompanying drawings.

FIGS. 1A to 4 are views showing the basic principles of an optical device according to the present invention.

Figure 1A:
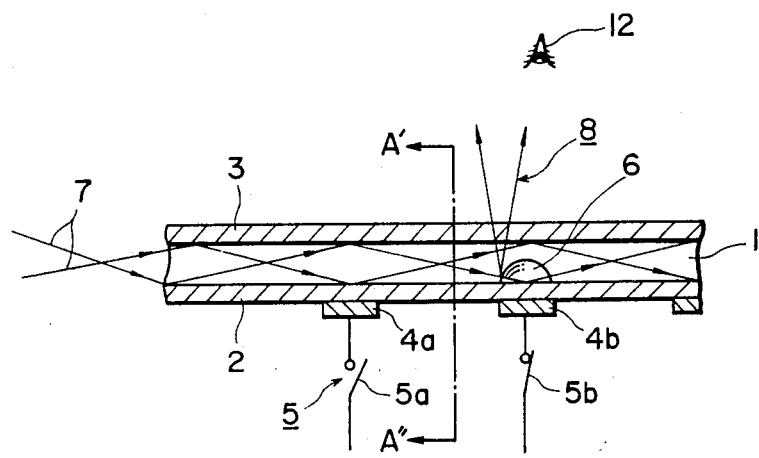
FIGS. 1A and 1B are schematic sectional views showing the principle of operation of an optical device according to the present invention as a light modulation device or a display device.
Figure 1B:
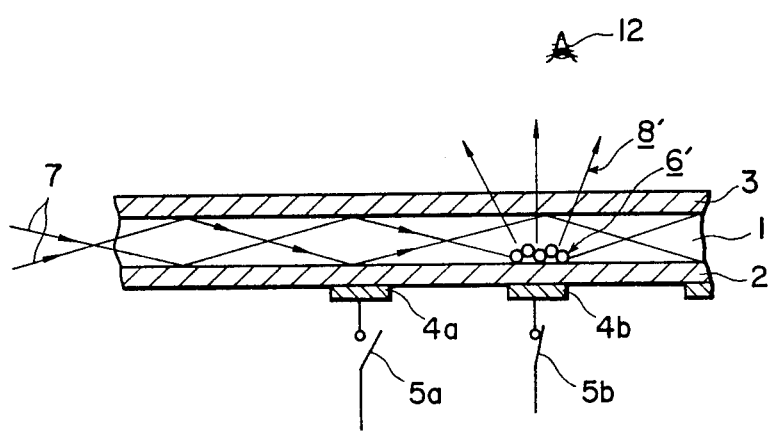

FIGS. 1A and 1B are partial, schematic longitudinal sectional views of an optical device according to the present invention, and FIG. 2A is a partial, schematic cross-sectional view of the optical device shown in FIG. 1A along the line A'—A". Referring to FIGS. 1A, 1B and 2A, a core layer 1 comprises a liquid having a relatively high refractive index compared with that of clad layers 2 and 3, and partially constitutes an optical waveguide to serve similarly to a core of an optical fiber.

The core layer 1 preferably has a thickness of 1 $\mu$m to 1 $\mu$m. Clad layers 2 and 3 correspond to the clad layer of an optical fiber, and vertically sandwich the core layer 1 therebetween. The clad layers 2 and 3 respectively comprise a transparent member having a relatively low refractive index compared with that of the core layer 1, so as to allow propagation of light through the core layer 1 utilizing the total reflection effect at the interfaces between the core layer 1 and the clad layers 2 and 3. Such a transparent member may include, for example, a glass or plastic having a low refractive index. Note that the clad layer 2 can be non-transparent. A heating device 4 for partially heating the core layer 1 such that a vapor bubble is formed is arranged adjacent at least one of the clad layers 2 and 3. In the case of this embodiment under discussion, the heating device 4 is arranged outside and in contact with the clad layer 2.

The heating device may be arranged outside and near the clad layer 2. The heating device is arranged in a ring-like over the peripheral portion of the outer surface of the clad layer or in a point-like, island-like, dotted-line or dot matrix format over the entire surface of the clad layer 2.

In the case of this embodiment, as shown in FIGS. 1A, 1B and 2A, as the heating device 4, resistance materials for heating (to be referred to as heating resistors hereinafter) 4a, 4b and so on are arranged in a dotted-line format on the clad layer 2. Each heating resistor has one end connected to ground and the other end connected to a corresponding electrode (not shown). Each of switches 5 (5a, 5b and so on) has one end commonly receiving a power source voltage and the other end connected to the electrode (not shown) connected to the corresponding heating resistor 4a, 4b or the like. A vapor bubble (to be referred to as a bubble hereinafter) 6 is formed in the core layer 1. The bubble 6 is formed upon boiling of the core layer 1 when the heating resistor 4b is energized upon turning on of the switch 5b and the generated heat is conducted to the core layer 1 through the clad layer 2. Incident light 7 within a visible light range propagates through the core layer 1, and output light 8 produced outside the device through the clad layer 3 is viewed by an observer 12.

The basic light modulation principle or display principle of the optical device of the present invention will now be described with reference to FIGS. 1A and 2A. When the light 7 becomes incident on the core layer 1 which has a relatively high refractive index and which is covered with the clad layers 2 and 3 Z5 having relatively low refractive indices under the condition that the core layer 1 is not heated and hence has a uniform refractive index distribution, the light 7 is totally reflected at the interface between the core layer 1 and the clad layer 2 or the clad layer 3. Thus, the light 7 propagates through the core layer 1 by repeated total reflection at these interfaces to the output end (the opposite end to the incident end), as may be apparent from the principle of an optical fiber (which may also be referred to as a cylindrical optical waveguide) or a thin film optical waveguide. If leakage of the light 7 occurs, a small amount of light as the output light 8 may reach the eyes of an observer 12 through the clad layer 3. However, in practice, the light 7 does not reach the observer 12.

The switch 5b is turned on, as shown in FIG. 1, in order to conduct electricity to the heating resistor 4b among other heating resistors 4a, 4b and so on, arranged in the dotted-line format. When the switch 5b is turned on, the portions of the clad layer 2 and the core layer 1 which are near the heating resistor 4b are heated, and the liquid in the corresponding portion is boiled so that bubble 6 is formed in the core layer 1. The light 7 is refracted, reflected and scattered at the surface of the bubble 6.

Then, of the light 7, the path of the light which reaches the bubble 6 is disturbed, and the conditions for total reflection as described above are also disturbed. Accordingly, at least part of the light which reaches the bubble 6 propagates no further through the core layer 1 but passes through the clad layer 3 to be produced outside the optical device as the output light 8. Then, the observer 12 perceives this light 8 as if it were being produced from the heating resistor 4b. If an optical sensor is arranged in place of the observer, it detects the light 8.

If the heating resistors 4a, 4b and so on are formed in small point-like shapes, small bubbles 6 are formed when the heating resistors 4a, 4b and so on are charged with electricity and generate heat. The small bubble 6 disturbs the path of the light 7, such that part of the light 7 is produced as the output light 8 from the optical device. Thus, the observer 12 perceives as if the heating resistors 4a, 4b and so on are emitting light in point form. On the other hand, if the heating resistors 4a, 4b and so on having other shapes are used, the observer 12 perceives as if such shapes are displayed.

If small heating resistors are arranged in a dot matrix format, a desired character or pattern can be displayed with a set of dots corresponding to the bubbles for observation by the observer when desired heating resistors are charged with electricity for heating.

The bubble 6 need not comprise a single bubble as shown in FIG. 1A. For example, a plurality of bubbles 6' can be formed as shown in FIG. 1B to produce output light 8'. In this case, the path of the light 7 is much disturbed by the plurality of bubbles 6', so that divergence of the output light 8' is widened.

The main component of a transparent liquid as the material for the core layer 1 may be a material selected from water, various types of organic solvents and combinations thereof. Examples of organic solvents may include an alkyl alcohol such as methyl alcohol, ethyl alcohol, n-propyl alcohol, isopropyl alcohol, n-butyl alcohol, sec-butyl alcohol, tert-butyl alcohol, isobutyl alcohol, pentyl alcohol, hexyl alcohol, heptyl alcohol, octyl alcohol, nonyl alcohol, or decyl alcohol; a hydrocarbon-type solvent such as hexane, octane, cyclopentane, benzene, toluene, or xylene; a halogenated hydrocarbon-type solvent such as carbon tetrachloride, trichloroethylene, tetrachloroethylene, tetrachloroethane, or dichlorobenzene; an ether-type solvent such as ethyl ether, butyl ether, ethylene glycol diethyl ether, or ethylene glycol monoethyl ether; a ketone-type solvent such as acetone, methyl ethyl ketone, methyl propyl ketone, methyl amyl ketone, or cyclohexanone; an ester-type solvent such as ethyl formate, methyl acetate, propyl acetate, phenyl acetate, or ethylene glycol monoethyl ether acetate; an alcohol-type solvent such as diacetone alcohol; an amide such as dimethylformamide or dimethylacetamide; an amine such as triethanolamine or diethanolamine; a polyalkylene glycol such as polyethylene glycol or polypropylene glycol; an alkylene glycol such as ethylene glycol, propylene glycol, butylene glycol, or hexylene glycol; a polyhydric alcohol such as glycerin; and a petroleum hydrocarbon-type solvent.

The refractive index of the transparent liquid as the material of the core layer 1 must be higher than that of the clad layers 2 and 3. Since the refractive index of the clad layers 2 and 3 is generally less than 1.5, examples of a liquid for the core layer 1 satisfying such a refractive index requirement are enumerated below.

| Refractive Index | Liquid for Core Layer |
| --- | --- |
| 1.500 | Butyl iodide, Chloro-1-bromo-ethylene, Diethyl-isoprene-dicarboxylate Ethoxy-methylene-cyclohexane-2-one(1) |
| 1.501 | Benzene, Butyl-isothiocyanate, Dimethyl-1-dichloromethylcyclohex-3-ene(1,4), dimethyl-3-ethyl-pyrazine(2,5) |
| 1.502 | Ethyl-1-allyl-5-methyl-pyrazol-5-carboxylate, Ethyl-dibromoacetate, Ethyl-5-methyltetrahydro-indazole(1), Ethylsorbate |
| 1.503 | Cedrene, Diethyl-benzene, Diethyl-phthalate, 1,2-Dimethyl-4-ethyl-benzene |
| 1.504 | Benzoic acid, Dihydro-camphoryl-chloride, 1,3-Dimethyl-4-ethylbenzene, |

-continued

| Refractive Index | Liquid for Core Layer |
|---|---|
| 1.5043 | 1,4-Dimethyl-2-ethylbenzene |
| 1.505 | Dicyclopentadiene, Dimethylbenzene |
| 1.506 | Dibromohexane, Diethyl-disulfide |
| 1.507 | Dibromo-butane(1,3), p-Isobutylanisate |
| 1.508 | Diamyl-cyanamide, Dibromo-pentane (2,3) |
| 1.509 | Dibromo-2-methylpropane |
| 1.510 | Ethoxy-0-xylene |
| 1.5107 | 1,3-Dimethyl-2-ethylbenzene |
| 1.511 | Dibromo-hexane |
| 1.512 | Dimethyl-3-ethylbenzene(1,2) |
| 1.513 | Dibromo-ethane(1,1), Dimethyl-amino-0-xylene |
| 1.514 | Chloro-maleoyl chloride, Butyro-0-cresyl-acetate |
| 1.515 | Dibromo-pentane(1,5) |
| 1.516 | Dihydroxy-naphthalene |
| 1.517 | Diethylstyrene |
| 1.518 | p-Ethoxyl-allyl-phenol |
| 1.519 | Dimethyl-4-bromopyrazole |
| 1.520 | Dimethyl-amino-0-xylene(4) |
| 1.521 | Ethyl-α,β-dimethyl-cinnamate |
| 1.522 | Chloro-fumaroyl-chloride |
| 1.523 | Chlorotoluene |
| 1.524 | 1,3-Dimethyl-4-allyl-5-anisol |
| 1.525 | Dibromopropane(1,3) |
| 1.526 | Ethyl-atropate |
| 1.527 | p-Dichlorobenzene |
| 1.528 | Dibromo-1,1,4-trimethyl-cyclohexane (3,4) |
| 1.529 | Benzyltrichloroacetate |
| 1.530 | Ethoxystyrene |
| 1.531 | Dimethylphenylcarbinol |
| 1.532 | Fluoro-nitrobenzene |
| 1.533 | Dimethyl-m-tolyl-ketone |
| 1.534 | 1,3-Dimethyl-5-phenyl-cyclohex-3-ene(1,3) |
| 1.535 | Creosol(3,1,4) |
| 1.536 | Ethyl-β-chloro-α-acrylate |
| 1.537 | Diethyl-dithiocarbonate |
| 1.538 | Ethyl-phenyl-carbamate |
| 1.539 | Butyro-anisole |
| 1.540 | Diallylphenol |
| 1.541 | Dimethyl-acetonylacetone |
| 1.542 | Methoxystyrene |
| 1.543 | Homocatechol |
| 1.544 | Ethyl-tribromo-acetate |
| 1.545 | Ethyl-allocinnamate |
| 1.546 | Ethyl-methyl-cinnamate |
| 1.547 | Iodomethyl-methyl-ether |
| 1.548 | Benzalacetone-dipropyl-ketone |
| 1.549 | Benzyl-3,5-dimethyl-pyrazole(1) |
| 1.550 | Dibromo-propane-2-ol(1,3) |
| 1.551 | Dimethyl-chromene(α) |
| 1.552 | Dichlorobenzene(0) |
| 1.553 | Chloro-1,3-dimethyl-4-benzene(5) |
| 1.554 | Ethyl-hydrindone(β) |
| 1.555 | 6-Methyl-chromanone |
| 1.556 | Ethyl-aniline |
| 1.557 | Ethyl-phenylproprionate |
| 1.558 | Ethyl-β-benzylamino-acetoacetate |
| 1.559 | Iodo-propane-1-ol(3) |
| 1.560 | Hydroxyacetophenone(p) |
| 1.561 | Propyl-indazole |
| 1.562 | Nitro-anisole(0) |
| 1.563 | Phenyl-3-hydroxy-pento-1-ene(1) |
| 1.564 | Triazobenzene |
| 1.565 | Dimethyl-1-keto-1,2,3,4-tetra-hydronaphthalene |
| 1.566 | Phenyl-1-p-tolyl-ethane |
| 1.567 | Propyl-styryl-ketone(iso) |
| 1.568 | Phenyl-tetrahydro-indazole(1) |
| 1.569 | Phthalyl-dichloride |
| 1.570 | Methylaniline |
| 1.571 | Ethyl-2-ethylindazole-3-carboxylate |
| 1.572 | Methyl-α-methyl-0-methoxycinnamate |
| 1.573 | 1-Phenyl-3-hydroxy-1-butylene |
| 1.574 | Phenyl-2,4-dimethyl-pyrazole(1) |
| 1.575 | Dimethyl-5-phenyl-cyclohexa-3,5-diene(1,3) |
| 1.576 | Nitro-p-cresol |
| 1.577 | Nitroso-methylaniline |
| 1.578 | Propenyl-p-cresol |
| 1.579 | Phenyl-β-methylstyrene(α) |
| 1.580 | 3-Methyl-5-chloro-pyrazole(1) |
| 1.581 | Methyl-2-ethylindazole |
| 1.582 | Phenyl-5-methylpyrazole |
| 1.583 | Phenylether |
| 1.584 | Propionyl-acetophenone |
| 1.585 | Methyl-2-methoxybenzoylacetone |
| 1.586 | Thiophenol |
| 1.587 | Phenylnitromethane-methylether |
| 1.588 | Ethyl-1-methoxy-2-naphthoate |
| 1.589 | Phenyl-cyclohexane |
| 1.590 | Triphenyl-methane |
| 1.591 | Methyl-0-benzoylbenzoate |
| 1.592 | Methyl-2,4-diethylnaphthalene |
| 1.593 | Tetrahydro-quinoline(1,2,3,4) |
| 1.594 | Ethyl-naphthoate |
| 1.595 | Ethyl-α-methyl-β-naphthoate |
| 1.596 | Phenyl-pyrazole |
| 1.597 | Fluoro-1,1,1,2-tetrabromo-ethane |
| 1.598 | Iodo-p-xylene |
| 1.599 | Tribromo-ethylene |
| 1.600 | Tribromo-propane |
| 1.601 | Methyl-2-ethylnaphthalene |
| 1.602 | Ethyl-methylcinnamylidene-acetate |
| 1.603 | Methylnaphthalene(β) |
| 1.604 | 4-iode-0-xylene |
| 1.605 | Ethoxy-thionaphthene |
| 1.606 | Methyl-6-methyl-1-naphthoate |
| 1.607 | 3-iode-0-xylene |
| 1.608 | Phenylpropiolic aldehyde |
| 1.609 | Phenylstyrene(α) |
| 1.610 | Titanium tetrachloride |
| 1.612 | Methyl-4-ethyl-2-acetyl-naphalene(1) |
| 1.613 | Phenyl-buta-1,3-diene(1) |
| 1.614 | Cinnamoyl chloride |
| 1.615 | Diphenyl-ketene |
| 1.616 | Dimethylnaphthalene(1,2) |
| 1.617 | Methylquinoline(3) |
| 1.618 | Methylnaphthalene(α) |
| 1.619 | Methyldiphenylamine(N) |
| 1.620 | Ethyl-4-acetylnaphthalene(1) |
| 1.621 | Toluquinoxaline |
| 1.622 | Isoquinoline |
| 1.623 | Quinoxaline |
| 1.624 | Methylacetate-8-acetylnaphthalene |
| 1.626 | Methylacetate-0-aminophenyl sulfide |
| 1.627 | Methylacetate-2-acetylnaphthalene |
| 1.628 | Methoxy-thionaphthene |
| 1.630 | Naphthonitrile |
| 1.632 | Methyl-0-bromophenyl sulfide |
| 1.633 | Thionaphthene |
| 1.634 | Phenylenediamine |
| 1.635 | Diphenyl sulfide |
| 1.636 | Methylstilbene |
| 1.638 | Tetrabromoethane(1,1,2,2) |
| 1.644 | Dimethylaminonaphthalene |
| 1.646 | Methyl-naphth-1-aldehyde(4) |
| 1.647 | Cyano-tetrabromide |
| 1.648 | Ethyl-aminonaphthalene(α) |
| 1.649 | Naphthylamine(β) |
| 1.653 | Methoxy-naphth-1-aldehyde(4) |
| 1.654 | Ethyl-aminonaphthalene(β) |
| 1.655 | Naphthaldehyde(α) |
| 1.657 | Phenanthrene |
| 1.658 | Bromonaphthalene(α) |
| 1.664 | Azoxybenzene |
| 1.666 | Sulfur monochloride |
| 1.670 | Naphthylamine(α) |
| 1.676 | Ethylanthracene |
| 1.680 | Methylanthracene |
| 1.683 | Naphthylenediamine |
| 1.693 | Tellurium diphenyl |
| 1.696 | Methylanthracene |
| 1.697 | Phosphorus bromide |
| 1.706 | Acetylene diiodide |
| 1.708 | Naphthylenediamine |
| 1.736 | Sulfur bromide |
| 1.743 | Methylene iodide |

-continued

| Refractive Index | Liquid for Core Layer |
| --- | --- |
| 1.885 | Hydrogen disulfide |

The above are only examples, and the liquid for the core layer according to the present invention is not limited to those enumerated above.

FIG. 3 shows a schematic sectional view of another optical device according to the present invention wherein a light diffusion layer 9 is formed adjacent to the clad layer 3 of the optical device shown in FIGS. 1A or 1B.

Referring to FIGS. 1A, 1B and 2A, at least part of the incident light 7, which part is deflected from its path by the bubble 6 and passed through the clad layer 3 as the output light 8 or 8', can be observed. However, this output light 8 or 8' has a slight directivity depending upon the form of the bubble 6, so that the angle of the field in which this output light 8 or 8' can be viewed is limited. Accordingly, when the light diffusion layer 9 is formed on the clad layer 3 as shown in FIG. 3, light passed through the clad layer 3 is diffused through the light diffusion layer 9, so that the angle of the field in which the diffused light can be observed is much widened, which is preferable to the observer.

In the embodiments described above, the heating means 4 need not always be formed outside the clad layer 2. As long as the objects of the present invention are achieved, the heating means can be formed within or in contact with the clad layer 2.

The section of the core layer 1 and the clad layers 2 and 3 of the optical device shown in FIG. 1A taken along the line A'—A" therein is shown to be rectangular in FIG. 2A. However, the core layer 1 may have a circular section as shown in FIG. 2B. In this case, the clad layers 2 and 3 are formed integrally with each other and are shown as a single tubular clad layer 2" (called a tubular optical waveguide). Thus, the core layer 1 and the clad layers 2 and 3 generally have a rectangular or circular section but are not limited thereto in the present invention.

FIG. 4 is a partial schematic longitudinal sectional view showing the basic configuration of an optical device according to another embodiment of the present invention which uses an infrared ray absorption layer as a heating device.

Referring to FIG. 4, a core layer 1 comprises a liquid. Clad layers 2 and 3 cover the respective surfaces of the core layer 1. Light 7 within a visible u light range is incident on the core layer 1 and propagates therethrough. Output light 8 is produced outside the device through the clad layer 3. An observer 12 observes the output light 8. The refractive index of liquid of the core layer 1 is relatively higher than that of materials of the clad layers 2 and 3. An infrared ray absorption layer 10 as a heating device is formed on the entire outer surface of the clad layer 2. When the liquid of the core layer 1 is boiled, a bubble 6 is formed in the core layer 1 in the following manner. When infrared rays 11 are irradiated onto the infrared ray absorption layer 10, the irradiated portion of the infrared ray absorption layer 10 generates heat. The heat in the infrared ray absorption layer 10 is conducted to part of the core layer 1, and locally heats and boils the core layer 1 to form the bubble.

Referring to FIG. 4, the light modulation principle and display principle of the optical device according to this embodiment will now be described.

When the infrared ray absorption layer 10 is not irradiated with the infrared rays 11 and, therefore, the core layer 1 is not heated and has a uniform refractive index distribution, the light 7 incident on the core layer 1 propagates through the core layer 1 by repeated total reflection at the interfaces between the core layer 1 and the clad layers 2 and 3. In this condition, no part of the light 7 reaches the observer 12 through the clad layer 3. Therefore, even if the observer 12 views the optical device, he cannot perceive any light.

When the infrared ray absorption layer 10 is irradiated with the infrared rays 11 as in the drawing, the irradiated portion of the layer 10 generates heat. The thus generated heat is conducted to the core layer 1 through the clad layer 2 and locally heats the core layer 1 so as to boil the liquid. Thus, the bubble 6 is formed in the core layer 1. Part of the light 7 is scattered, refracted, and reflected at the surface of the bubble 6.

As a result of this, the path of the portion of the light 7 which has reached the bubble 6 is disturbed; total reflection between the core layer and the clad layer 3 is disturbed. Then, at least part of the light does not continue to propagate through the core layer 1 but is produced as the output light 8 outside the optical device through the clad layer 3. The output light 8 is then viewed by the observer 12. The observer 12 has the impression that the output light 8 is produced from the heated portion of the infrared ray absorption layer 10. If a light sensor is arranged in place of the observer 12, it can detect light when the output light 8 becomes incident on the light-receiving surface of the light sensor. If the clad layer 2 or both the clad layer 2 and the heating device are transparent in the optical device having the configuration as shown in FIGS. 1 to 4, part (not shown) of the light 7 which reaches the bubble 6 or bubbles 6' can pass through the clad layer 2 or through both the clad layer 2 and the heating device, depending upon the form of the bubble 6 or bubbles 6'. Accordingly, in this case, the output light can be viewed from both surfaces of the optical device.

The bubble 6 formed in the core layer 1 of the optical device having the configuration shown in FIGS. 1 to 4 disappears when the supply of heat thereto is stopped and when it is cooled (by natural cooling or forced cooling). When the bubble 6 disappears, the light 7 which has reached the portion of the core layer 1 in which the bubble 6 has been formed is totally reflected at the interface between the core layer 1 and the clad layer 2 and propagates through the core layer 1. In the optical device of the embodiment shown in FIGS. 1 to 4, the heating device need not be arranged outside the clad layer 2. However, as long as the objects of the present invention are achieved, the heating device may be arranged inside the clad layer or in contact with the inner surface of the clad layer at the side of the core layer, or in these portions. This also applies to the case of a mirror to be described below.

The clad layer 2 of the optical device having the configuration as shown in FIGS. 1 to 4 may be replaced by a mirror which is obtained by forming a light-reflecting metal film on a substrate. However, in this case, the mirror surface should be arranged to be in contact with or near the core layer 1.

Figure 5:
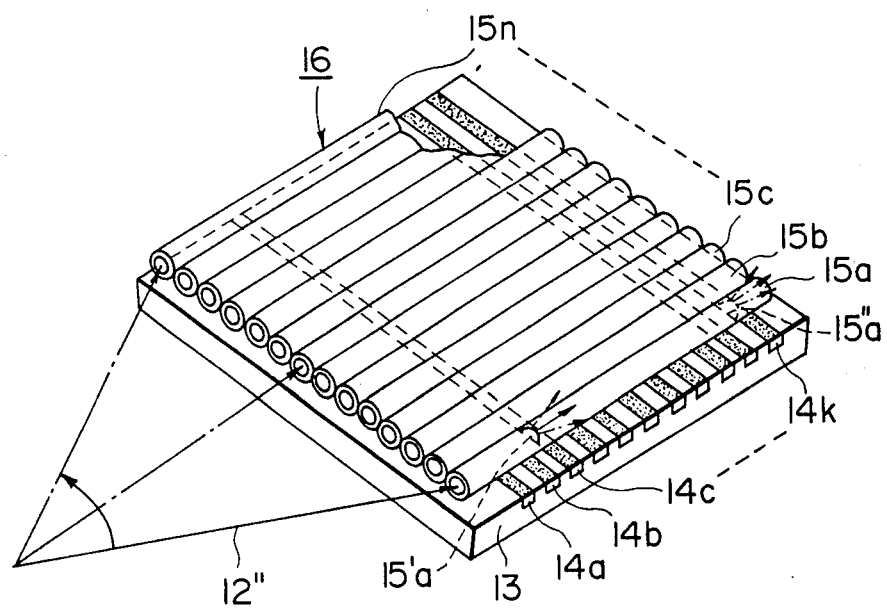
FIGS. 5 to 7 are schematic perspective views showing the constitution of a display apparatus as an application of the present invention.

FIG. 5 is a partially exploded schematic perspective view of an embodiment of a display apparatus which adopts the light modulation principle of the optical waveguide shown in FIGS. 1A, 1B and 2B. Referring to FIG. 5, a plurality of resistance materials for heating (hereinafter, referred to as heating resistors) 14 (14a, 14b, 14c, ..., 14k) are formed in a stripe format in a substrate 13. An optical waveguide panel is arranged on the heating resistors 14. The optical waveguide panel is obtained by arranging next to each other a number of cylindrical optical waveguides 15 (15a, 15b, 15c, ..., 15n) each having a core layer and a clad layer of longitudinal and cross sections as shown in FIGS. 1A, 1B and 2B. The optical waveguides 15 have their longitudinal axes perpendicular to those of the heating resistors 14. A laser beam 12" having a wavelength falling within the visible light range is repeatedly caused to scan in the direction indicated by the arrow and becomes sequentially incident on the core layers of the respective cylindrical optical waveguides 15. A display device 16 includes the parts as described above except the laser beam 12". Bubbles 15'a and 15"a are formed when the core layer of the cylindrical optical waveguide 15a is heated such that it boils. Bubbles formed in the other optical waveguides are omitted for the sake of simplicity.

When none of the heating resistors 14 is charged with electricity for heating, the core layers of the respective optical waveguides 15 are not heated. Accordingly, no bubbles as that shown in FIGS. 1A and 1B are formed in the core layers of the optical waveguides 15. The laser beam 12" which becomes incident on the core layer at one end of a selected optical waveguide among the optical waveguides 15 propagates through the selected optical waveguide and is produced from the other end of the optical waveguide by repeated total reflection at the interface between the core layer and the clad layer.

When only the heating resistors 14c and 14k are charged with electricity for heating and the laser beam 12" becomes incident on the optical waveguides 15, bubbles (the bubbles 15'a and 15"a for the optical waveguide 15a) are formed in the core layers of the respective optical waveguides 15 crossing the heating resistors 14c and 14k. Meanwhile, the laser beam 12" incident on the optical waveguide 15a is disturbed in its path by the bubbles 15'a and 15"a, as was described with reference to FIG. 1, and a part of the disturbed light is produced as output light outside the light modulation device 16 through the clad layer of the cylindrical optical waveguide 15a, as indicated by the arrows.

Then, a suitable number of heating resistors 14 are heated by conduction of electricity and the laser beam 12" becomes incident on the optical waveguide 15b so that display in the optical waveguide 15b is performed. This is sequentially repeated for the optical waveguides 15c to 15n so as to provide a two-dimensional display using the display device 16 as one screen. The bubbles previously formed in the core layers of the optical waveguides, that is, the bubbles formed in the optical waveguides other than the optical waveguide 15a and formed simultaneously with the bubbles 15'a and 15"a of the optical waveguide 15a, e.g., the bubbles formed in the Optical waveguide 15b, are cooled (naturally or forcibly cooled) and eliminated before the laser beam 12" becomes incident on the optical waveguide 15b for the current display. Thus, the current display of the optical waveguide 15b may not be disturbed by the previous display. When it is desired to display the points corresponding to the heating resistors 14c and 14k during current display by the optical waveguide 15b, the heating resistors 14c and 14k need only be charged with electricity for heating. If the optical waveguide 15b is not required for the current display, the heating resistors 14c and 14k are not charged with electricity.

Figure 6:
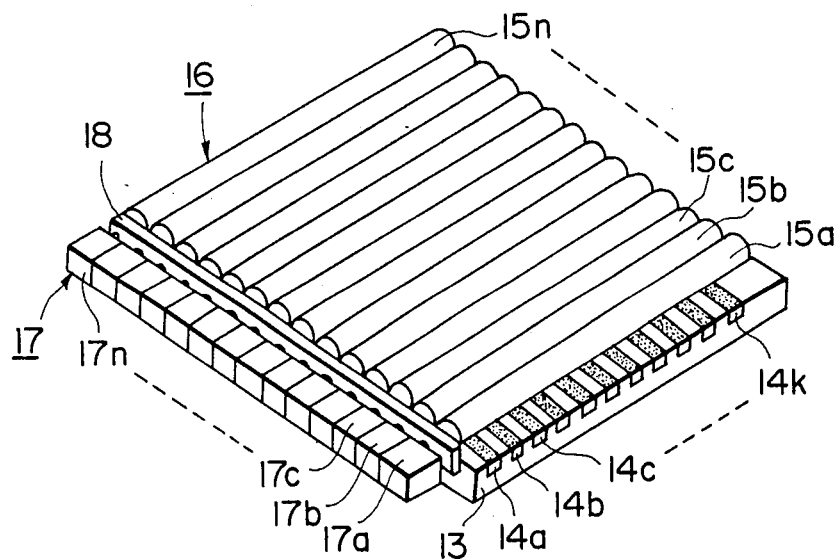

FIG. 6 is a schematic perspective view of a display apparatus wherein a light source comprising a light-emitting diode array is attached to the display device shown in FIG. 5.

Referring to FIG. 6, heating resistors 14 (14a, 14b, ..., 14k) are formed in a substrate 13. An optical waveguide panel is arranged on the heating resistors 14. The optical waveguide panel has cylindrical optical waveguides 15 (15a, 15b, ..., 15n), each of which has a core layer and a clad layer, and which are arranged next to each other and perpendicularly to the heating resistors 14. A flat microlens array 18 is arranged at the incident side of the cylindrical optical waveguides 15 such that light fluxes emitted from a light-emitting diode array 17 consisting of light-emitting diodes 17a, 17b, ..., 17n are effectively supplied to the corresponding optical waveguides 15. The flat microlens array 18 may be omitted. Note that the light-emitting diodes 17a, 17b, 17c, ..., 17n and the optical waveguides 15a, 15b, 15c, ..., 15n have a one-to-one correspondence.

The mode of display operation in the case of the apparatus shown in FIG. 6 is the same as that of FIG. 5. A suitable number of heating resistors 14 are charged with electricity, and bubbles are formed in the core layers of those optical waveguides 15 which cross the heated resistors 14. At the same time, the corresponding light-emitting diodes emit light which becomes incident on the optical waveguides which are to perform display. Then, these optical waveguides perform the desired display in accordance with the display principle described with reference to FIGS. 1A, 1B and 5. When the light-emitting diodes 17a, 17b, 17c, ..., 17n) of the light-emitting diode array 17 are sequentially scanned, the display device 16 provides a two-dimensional display as one frame.

In the apparatus shown in FIG. 6, the heating resistors can be sequentially charged with electricity for heating and a desired number of light-emitting diodes can be energized in synchronism with a heating signal to achieve a similar display.

Figure 7:
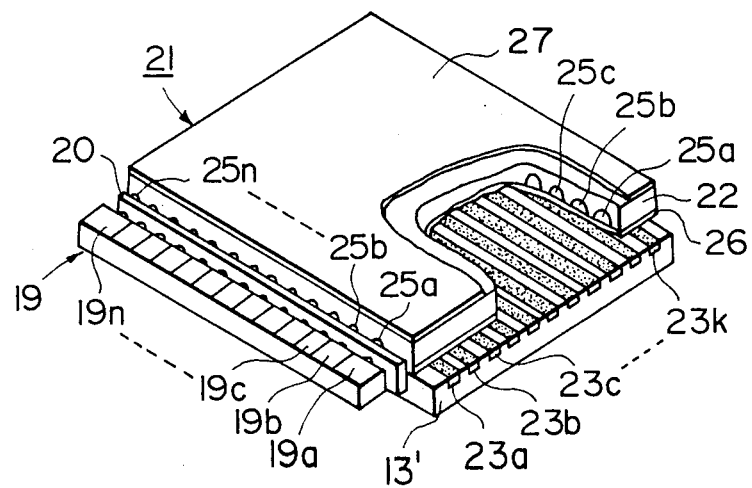

FIG. 7 is a partially exploded schematic perspective view of another embodiment of a display apparatus which utilizes the optical device shown in FIG. 1.

Referring to FIG. 7, a clad layer 22 is transparent and comprises a flat member having a relatively low refractive index and a number of grooves formed therein in a stripe format. Another clad layer 26 also comprises a flat member having a relatively low refractive index and is formed integrally by thermal fusion or the like with the surface of the clad layer 22 in which the grooves are formed. Thus, the grooves of the clad layer 22 become elongated channels when the clad layers 22 and 26 are adhered together in this manner. A liquid having a relatively high refractive index and serving as a core layer is filled in these channels. Thus, a number of parallel optical waveguide channels 25 (25a, 25b, 25c, ..., 25n) are formed. The clad layers 22 and 26 and the optical waveguide channels 25 constitute an optical waveguide panel. A number of heating resistors 23 (23a, 23b, 23c, ..., 23k) are formed in a stripe format in a substrate 13'. Note that the optical waveguide channels 25 are formed perpendicularly to the heating resistors 23.

According to another effective method for preparing such an optical waveguide panel as described above, a dielectric having a low refractive index such as $SiO_2$ is coated on the heating resistors 23 in the substrate 13' to form the clad layer 26. Thereafter, the substrate 13' and the clad layer 22 with grooves are adhered to each other.

A light diffusion layer 27 is formed on the clad layer 22. For example, the upper surface of the clad layer 22 may be formed to have small identations to provide the light diffusion layer 27. The cross section of the optical waveguide channels 25 in the longitudinal direction is the same as that shown in FIG. 3. A display device 21 comprises all these parts as described above. A light-emitting diode array 19 consisting of light-emitting diodes 19a, 19b, 19c, ..., 19n is arranged at the incident side of the optical waveguide channels 25 through a flat microlens array 20.

The display operation of the apparatus shown in FIG. 7 is the same as that described with reference to FIGS. 5 or 6. More specifically, of the heating resistors 23, selected heating resistors are charged with electricity for heating, and parts of the core layers of the optical waveguide channels 25 crossing these selected heating resistors are boiled to form bubbles as described with reference to FIG. 1. Selected light-emitting diodes of the light-emitting diode array 19 emit light which becomes incident on the core layers of the corresponding optical waveguide channels. Then, the path of the light which has propagated by repeated total reflection at the interfaces between each core layer and the corresponding clad layer and which has reached the bubble is disturbed by the bubble. At least part of the light whose path is disturbed in this manner is passed through the clad layer 22 and is diffused by the light diffusion layer 27 to be produced from the display device 21 as display light. In this manner, suitable heating resistors 23 are charged with electricity for heating and the corresponding diodes 19a, 19b, 19c, ..., 19n of the light-emitting diode array 19 are energized in synchronism therewith for point display. This operation is repeated to provide a two-dimensional display from the display device 21. The bubbles formed in the core layers of the selected optical waveguide channels is cooled and then eliminated before the next scanning operation, so that the subsequent display is not disturbed.

In the apparatus having the configuration shown in FIGS. 5 to 7, the density of the heating resistors attainable in practice is 8 to 16 resistors/mm, the attainable density of the optical waveguides is 8 to 20 optical waveguides/mm, and the attainable density of the optical waveguide channels is 8 to 16 optical waveguide channels/mm.

Figure 8:
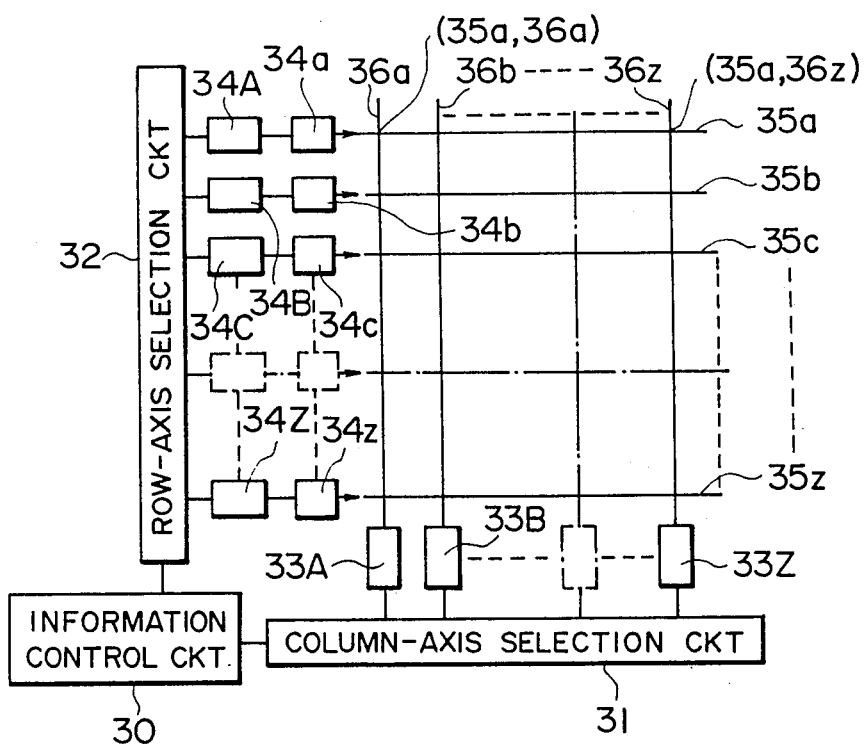
FIG. 8 is a block diagram of a display apparatus as an application of the present invention.

FIG. 8 is a block diagram of a display apparatus as an application of the present invention.

Referring to FIG. 8, the respective constituents of each display device of the apparatus having the configuration as shown in FIGS. 6 and 7 will be described in detail with reference to a case wherein the display devices are driven in a matrix format. A row-axis selection circuit 32 is electrically coupled to row-axis drivers 34A, 34B, 34C, ..., 34Z through signal lines. The row-axis driver 34A is connected to a light-emitting diode 34a of a light-emitting diode array 34 (34a, 34b, 34c, ..., 34z), and the row-axis driver 34B is connected to the light-emitting diode 34b. Similarly, the row-axis driver 34C is connected to the light-emitting diode 34c, and so on. Finally, the row-axis driver 34Z is connected to the light-emitting diode 34z. A column-axis selection circuit 31, column-axis drivers 33A, 33B, ..., 33Z, and heating resistors 36a, 36b, ..., 36z are connected in a similar manner. An information control circuit 30 is electrically coupled to the row-axis selection circuit 32 and the column-axis selection circuit 31 through signal lines. Optical waveguides 35a, 35b, 35c, ..., 35z have the same basic constitution as that described in FIGS. 1 to 3 and are arranged in correspondence with the light-emitting diodes 34a, 34b, 34c, ..., 34z. The information control circuit 30 produces an information control instruction so as to instruct the row-axis selection circuit 32 as to which one of the optical waveguides 35a, 35b, 35c, ..., 35z as row-axes is to be selected. The information control circuit 30 also supplies a similar instruction to the column-axis selection circuit 31 as to which one of the heating resistors 36a, 36b, ..., 36z as column-axes is to be selected.

The light-emitting diodes 34a, 34b, 34c, ..., 34z correspond to the light-emitting diodes shown in FIGS. 6 and 7. The optical waveguides 35a, 35b, 35c, ..., 35z correspond to the tubular optical waveguides or optical waveguide channels shown in FIGS. 6 and 7. The heating resistors 36a, 36b, ..., 36z correspond to those shown in FIGS. 6 and 7.

The method of driving the display apparatus shown in FIGS. 6 and 7 will be described with reference to FIG. 8. When the row-axis driver 34A is selected by the instruction signal from the information control circuit 30, the row-axis driver 34A is charged with electricity for a predetermined period of time. During this predetermined period of time, the light-emitting diode 34a emits light. The light emitted from the light-emitting diode 34a is guided to the optical waveguide 35a. When the row-axis driver 34B is selected next, the light-emitting diode 34b emits light similarly, and the light is guided to the optical waveguide 35b. In this manner, the light is scanned in the line sequence in correspondence with the optical waveguides 35a, 35b, ..., 35z. When a video signal as one of information control signals from the information control circuit 30 is supplied to the column-axis selection circuit 31, the column-axis selection circuit 31 selects a heating resistor as a predetermined column-axis. When the column-axis selection circuit 31 selects, for example, the heating resistors 36a and 36z, the column-axis drivers 33A and 33Z energize the heating resistors 36a and 36z in response to 33A and 33Z column selection signals from the column-axis selection circuit 31. Then, the portions of the core layers of the optical waveguides 35a, 35b, 35c, ..., 35z which cross the heating resistors 36a and 36z are heated to boil, and the bubbles are formed. When application of electricity to the heating resistors 36a and 36z is discontinued by the OFF signal, the bubbles are cooled and eliminated so that the original state is restored. If the selection of the row-axis, that is, the optical waveguide 35a and selection of the column-axis are performed in synchronism with each other in this embodiment, light is produced from intersections (selected points) (35a, 36a) and (35a, 36z) between the selected heating resistors 36a and 36z charged with electricity for heating and the selected optical waveguide 35a. In this manner, in accordance with instruction signals from the information control circuit 30, the optical waveguides 35a, 35b, 35c, ..., 35z as row-axes and the heating resistors 36a, 36b, ..., 36z as column-axes are properly selected and operated to provide a two-dimensional display.

The material for the heating resistors as described above may be a metallic compound such as hafnium boride or tantalum nitride, or a transparent conductor such as indium tin oxide (I.T.O.).

Figure 9:
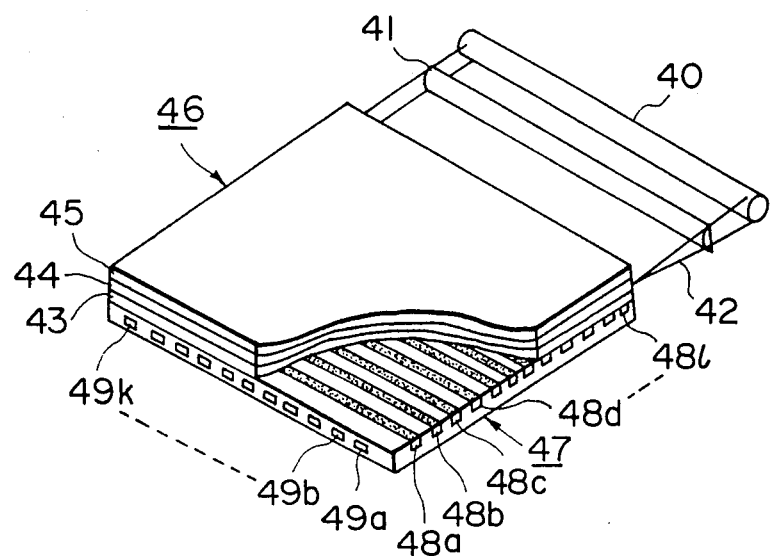
FIG. 9 is a schematic perspective view showing the constitution of another display apparatus as an application of the present invention.

FIG. 9 is a partially exploded schematic perspective view of another display apparatus utilizing the light modulation principle of the optical device shown in FIG. 1.

Figure 10:
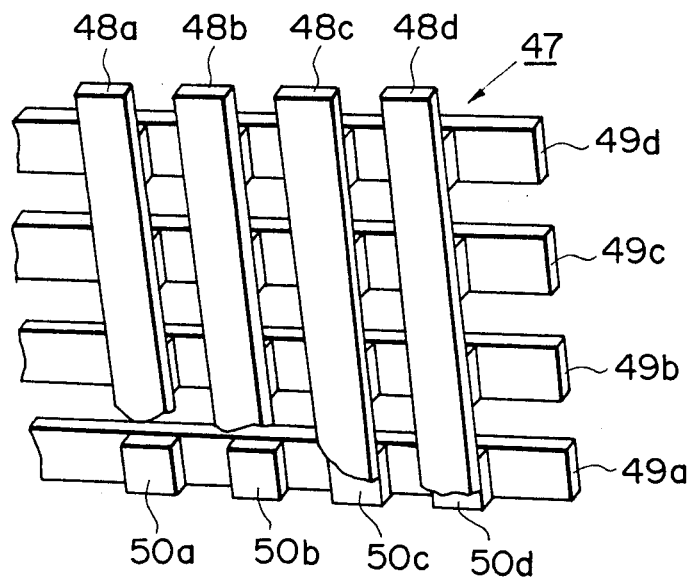
FIG. 10 is a partial, schematic perspective view showing the constitution of a heating device used in the display apparatus shown in FIG. 9.

Referring to FIG. 9, a flat optical waveguide 46 as an optical waveguide panel consists of clad layers 43 and 45 comprising flat members having a relatively low refractive index and a core layer 44 which is interposed between the clad layers 43 and 45 and which consists of a liquid or the like having a relatively high refractive index, as described with reference to FIGS. 1A and 1B. The section of the flat optical waveguide 46 is the same as that shown in FIGS. 1A, 1B and 2A except for the heating device used. An illuminating light flux 42 from a linear light source 40 is focused through a cylindrical lens 41 and becomes incident on one end of the core layer 44. A heating device 47 has a configuration as shown in detail in FIG. 10. Column lines 48a, 48b, 48c, . . . , 48l (to be referred to as the column lines 48 hereinafter) and row lines 49a, 49b, . . . , 49k (to be referred to as the row lines 49 hereinafter) comprise metal films having good electrical conductivity. Resistance materials for heating, to be referred to as heating resistors, are arranged at the intersections of the column lines 48a, 48b, 48c, . . . , 48l and the row lines 49a, 49b, . . . , 49k. FIG. 10 is a partially exploded perspective view of the heating device 47, showing the row lines 49a, 49b, 49c and 49d, and the column lines 48a, 48b, 48c and 48d. The row lines 49 and column lines 48 cross perpendicularly, and the heating resistors are arranged at the intersections thereof. For example, heating resistors 50a, 50b, 50c and 50d (to be referred to as heating resistors 50 hereinafter) are arranged at the intersections of the row line 49a and the column lines 48a, 48b, 48c and 48d. A nonconductive film such as an SiO$_2$ film or the like (not shown) is formed on non-intersecting portions of the row lines 49 and the column lines 48, i.e., portions having no heating resistor 50 arranged therebetween.

The mode of operation of the display apparatus of the present invention will now be described with reference to FIGS. 9 and 10. The illuminating light flux 42 from the linear light source 40 becomes incident on one end of the core layer 44 of the flat optical waveguide 46 through the cylindrical lens 41. When the core layer 44 is not heated by the heating device 47, light is produced from the other end of the core layer 44 after propagating through the core layer 44 in accordance with the principle described with reference to FIG. 1. If it is assumed that a suitable row line is selected from the row lines 49 and a suitable column line is selected from the column lines 48, the heating resistor at the intersection of these selected lines is energized. Assume that the row line 49a and the column lines 48b and 48d are selected, and a voltage is applied thereacross. Then, the heating resistors 50b and 50d at the intersections of the row line 49a and the column lines 48b and 48d are energized. The heat generated by the heating resistors 50b and 50d is conducted to parts of the core layer 44 through the clad layer 43 above the resistors 50b and 50d. Thus, two parts of the core layer 44 are heated by the heating resistors 50b and 50d, respectively, and bubbles (not shown) as shown in FIG. 1 are formed. Of the illuminating light flux 42 which propagates through the core layer 44, the path of at least part of it is disturbed by the bubbles as described with reference to FIG. 1, such that output light (display light) is produced outside the display apparatus 46 through the clad layer 45. A two-dimensional display can be performed by proper selection of the row and column lines 49 and 48 in this manner. The circuit for driving the display apparatus as described above has a configuration as described below.

Referring to the apparatus shown in FIG. 8, the light-emitting diodes 34a, 34b, 34c, . . . , 34z, the optical waveguides 35a, 35b, 35c, . . . , 35z, and the heating resistors 36a, 36b, 36c, . . . , 36z are omitted; the row lines 49 shown in FIG. 9 are respectively connected to the row-axis drivers 34A, 34B, 34C, . . . , 34Z; and the column lines 48 as shown in FIG. 9 are connected to the column-axis drivers 33A, 33B, 33C, . . . , 33Z. This circuit operates the display apparatus shown in FIG. 9 in the same manner as that described with reference to FIG. 8.

A heating device may alternatively be used wherein heating resistors replace the row and column lines 49 and 48, and a thermally conductive and electrically insulating member replaces each heating resistor 50. In this case, portions of the heating resistors where the row- and column-axes cross each other are particularly heated, so that the bubbles as shown in FIG. 1 are formed on the portions of the core layer corresponding to these heated portions. In those portions of the core layer heated by the remaining portions of the heating resistors which do not intersect each other, the core layer is not boiled so that the bubbles are not formed, and therefore the display is not disturbed.

Figure 11:
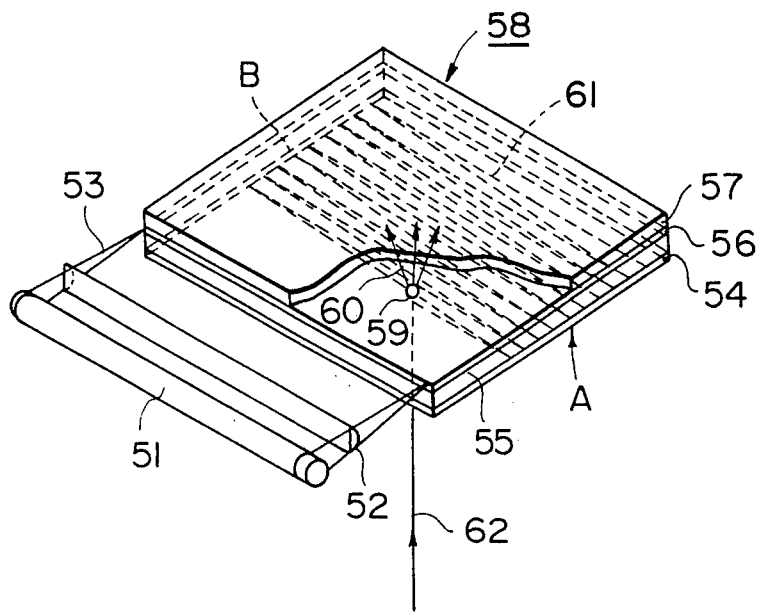
FIG. 11 is a sysmatic perspective view of another display apparatus as an application of the present invention.

FIG. 11 is a schematic perspective view of another display apparatus which utilizes the principle of light path modulation the optical device shown in FIG. 4.

Referring to FIG. 11, a flat optical waveguide 58 as a display device has a similar configuration in section to the optical device shown in FIG. 4. The optical waveguide 58 comprises an infrared ray absorption layer 54, a thermally conductive clad layer 55 comprising a flat member of a relatively low refractive index, a core layer 56 comprising a liquid or the like of a relatively high refractive index, and a transparent clad layer 57 comprising a flat member of a relatively low refractive index. These layers are stacked in the order named. That part of the flat optical waveguide 58 which excludes the infrared ray absorption layer 54 is called an optical waveguide panel. An illuminating light flux 53 from a linear light source 51 is focused by a cylindrical lens 52 and is guided to the core layer 56 of the optical waveguide 58. An infrared ray beam 62 is radiated from a radiation generating means (e.g., a radiation generating means comprising a laser oscillator or the like). The infrared ray beam 62 is caused to two-dimensionally scan along a track 61 on the infrared ray absorption layer 54 of the optical waveguide 58. The infrared ray beam 62 is modulated by a video information signal. A bubble 59 is formed when the portion of the infrared ray absorption layer 54 irradiated with the infrared ray beam 62 generates heat, and the generated heat is conducted to a portion of the core layer 56 through the clad layer 55 to boil that portion. Of the illuminating light flux 53 which propagates through the core layer 56 and reaches the bubble 59, at least part of it is produced as output light 60 (display light) outside the optical waveguide 58 through the clad layer 57.

The mode of operation of the display apparatus as shown in FIG. 11 will now be described. The illuminating light flux 53 from the linear light source 51 is focused by the cylindrical lens 52 and becomes incident on the core layer 56 of the optical waveguide 58. When the infrared ray beam 62 is not irradiated onto the infrared ray absorption layer 54 and the bubble 59 is not formed in the core layer 56, the illuminating light flux 53 incident on one end of the core layer 56 is totally reflected at the interfaces between the core layer 56 and the clad layers 55 and 57 due to the difference in the refractive indices, and thus propagates through the core layer 56 of the optical waveguide 58 to reach the other end of the core layer 56. In this state, the modulated infrared ray beam 62 is irradiated onto the lower surface of the infrared ray absorption layer 54 along the track 61.

Assume that the infrared ray beam 62 is irradiated onto the infrared ray absorption layer 54 along the track 61. The infrared ray absorption layer 54 is heated, and the heat is conducted to the core layer 56 through the clad layer 55 to boil a part of the core layer 56. Then, the bubble 59 is formed in the core layer 56, as described with reference to FIG. 4. When a portion of the illuminating light flux 53 propagating through the core layer 56 reaches the bubble 59, the path of such light is disturbed by the bubble 59 in the manner described with reference to FIG. 4. A portion of the light whose path is disturbed is produced as the output light 60 outside the flat optical waveguide 58 through the clad layer 57, as described with reference to FIG. 4. When the infrared ray beam 62 is no longer irradiated onto the portion of the infrared ray absorption layer 54 corresponding to the bubble 59 formed in the core layer 56 and the supply of heat is thus stopped, the bubble 59 is naturally or forcibly cooled, and disappears. Thus, no output light 60 as display light is produced through the clad layer 57. In this manner, a number of bubbles are formed in the core layer 56 in accordance with the light modulation of the infrared ray beam 62, and a two-dimensional display is provided using the optical waveguide 58 as one frame.

In order to improve the optical waveguide efficiency, the flat optical waveguide 58 can be replaced by a transverse dense array of cylindrical optical waveguides as shown in FIGS. 2A, 5 and 6 with a different heating device, or by optical waveguide channels as shown in FIG. 7.

Figure 12:
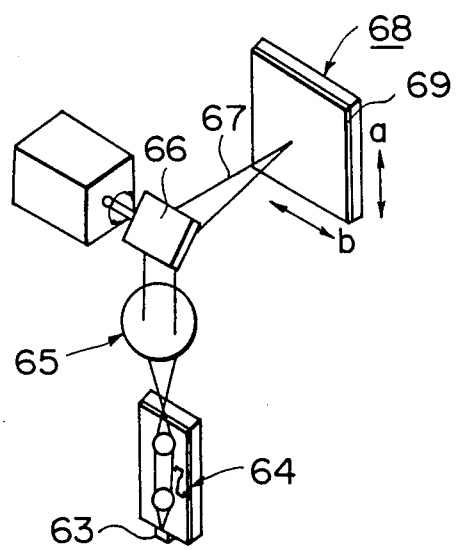
FIG. 12 is a schematic perspective view showing the constitution of a two-dimensional scanning mechanism used in the display apparatus shown in FIG. 11.

FIG. 12 is a perspective view of one embodiment of a scanning mechanism for scanning or deflecting an infrared ray beam in the apparatus shown in FIG. 11.

Referring to FIG. 12, an infrared ray beam 67 from a laser oscillator as a laser light source is passed through a thin-film waveguide type deflector 64 and a lens 65 and is reflected by a galvanomirror 66. The infrared ray beam 67 scans at high speed an infrared ray absorption layer 69 of a display device 68 which corresponds to the infrared ray absorption layer 54 of the flat optical waveguide 58 shown in FIG. 11. The galvanomirror 66 is for scanning the light in the direction indicated by arrow a, and the deflector 64 is for scanning the light in the direction indicated by arrow b. One of the galvanomirror 66 and the deflector 64 serves as a horizontal scanner, and the other serves as a vertical scanner.

A two-dimensional scanning mechanism comprising a combination of a galvanomirror and a polygon or the like may also be used.

Figure 13:
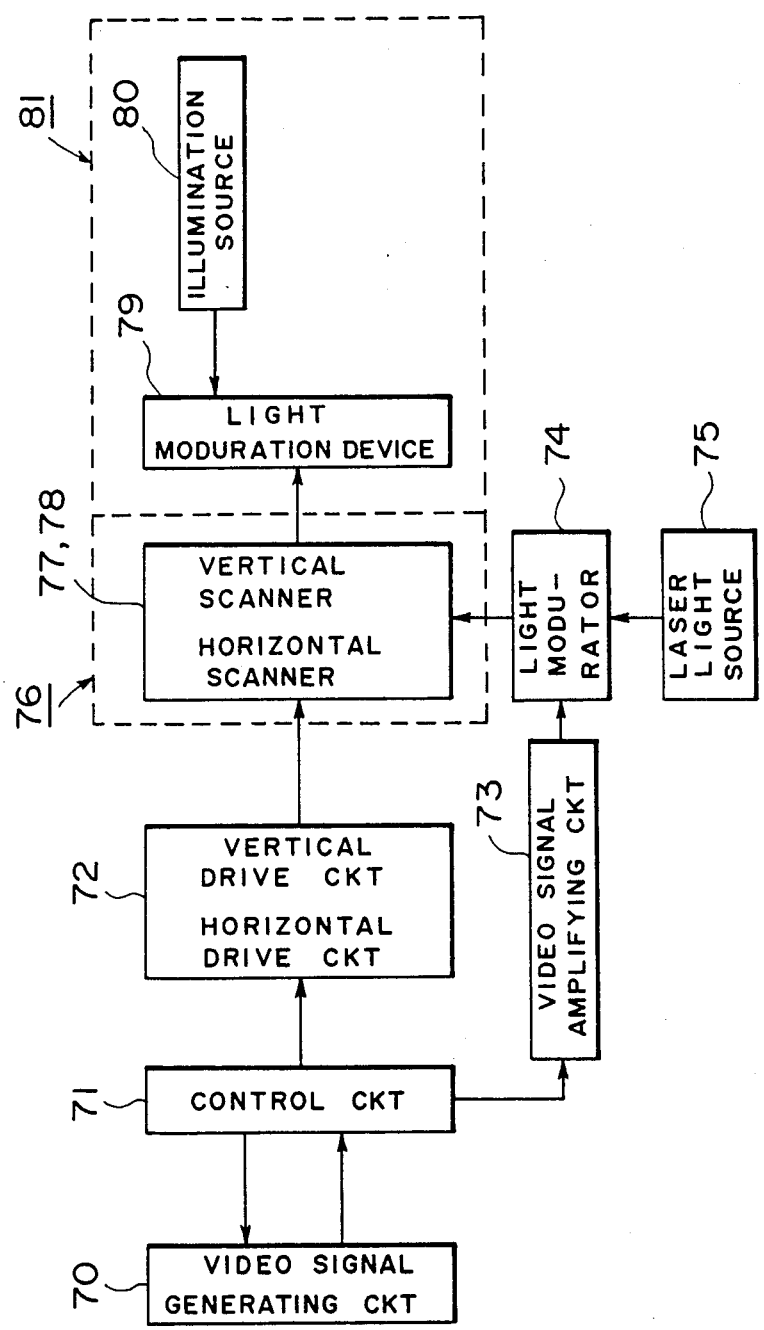
FIG. 13 is a block diagram of a display apparatus as an application of the present invention.

FIG. 13 is a block diagram of a light modulation apparatus or a display apparatus as a whole as an application of the present invention, in particular, a light modulation apparatus using a modulated infrared ray beam.

A video signal generating circuit 70 generates a video signal. A control circuit 71 controls the video signal and supplies it to a video signal amplifying circuit 73 and a horizontal and vertical drive circuit unit 72. A light modulator 74 modulates an infrared ray beam from a laser light source 75 in accordance with a signal from the video signal amplifying circuit 73. Light modulated by the light modulator 74 becomes incident on a horizontal scanner 78 or a vertical scanner 77. The horizontal and vertical scanners 78 and 77 operate in response to drive signals synchronous with the video signal from the horizontal and vertical drive circuit unit 72. The infrared ray beam from the scanner becomes incident on the infrared ray absorption layer of a light modulation device 79. Light from an illumination source 80 is incident on the core layer of the light modulation device 79. An example of the configuration of the scanning mechanism 76 is partially shown in FIG. 12, and an example of the configuration of a display apparatus 81 is shown in FIG. 11.

A video signal from the video signal generating circuit 70 is amplified by the video signal amplifying circuit 73 through the control circuit 71. In response to an amplified video signal, the light modulator 74 is driven to modulate the infrared ray beam produced from the laser light source 75. Horizontal and vertical synchronous signals are produced from the control circuit 71 to drive the horizontal and vertical scanners 78 and 77 through the horizontal and vertical driver circuit unit 72. In this manner, a thermal two-dimensional image comprising bubbles is formed in the core layer of the light modulation device 79. The subsequent operation of the light modulation apparatus 81 is as has been described with reference to FIG. 11 and will not be repeated here. When a TV wave is to be received, a TV receiver is used in place of the video signal generating circuit 70.

The heating device can be incorporated into the optical waveguide panel if the heating resistor or the infrared ray absorption layer, of the display apparatus shown in FIGS. 5 to 7 and 9 to 11 is formed within a clad layer of the panel or at the interface between the core layer and the clad layer of the panel. In this case, even if the heating device is arranged at the interface between the core layer and the clad layer, the display can be performed in accordance with the light modulation principle or display principle described with reference to FIGS. 1 to 4, provided that the total reflection condition between the heating device and the core layer for propagating light therethrough is satisfied.

As a means for absorbing or moderating an increase in pressure upon formation of a bubble, a known pressure absorbing means or a known pressure moderating means (not shown) is preferably incorporated.

As has been described in detail above, the main effects obtained according to the present invention are as enumerated below:

1. Since small vapor bubbles can be arranged at a high density as picture element unit for display, a high-resolution image display can be performed.

2. When the duration of the vapor bubble as a display picture element in the liquid layer is adjusted, a still picture or a motion picture including a slow motion picture can be easily displayed.

3. The optical device has a relatively simple structure, excellent productivity, excellent durability, and high reliability.

4. The device can be applied to a wide variety of drive methods.

What is claimed is:

1. An optical device comprising an optical waveguide having, as a basic unit, a core layer of a liquid having a relatively high refractive index and a clad layer having a relatively low refractive index and covering said core layer, heat generating means for heating a part of said core layer to form a vapor bubble in said liquid of said core layer, said heat-generating means being positioned externally of said waveguide and including a plurality of elongated heating members crossing a longitudinal direction of said waveguide, means for selectively heating said heating members, said selective heating means being positioned externally of said waveguide, means for causing light to be incident on said waveguide along said longitudinal direction and cooling means for eliminating said vapor bubble.

2. An optical device comprising an optical waveguide panel having a plurality of cylindrical optical waveguides each comprising a basic unit of a core layer of a liquid having a relatively high refractive index and a clad layer having a relatively low refractive index and covering said core layer, heat-generating means for heating a part of said core layer of said optical waveguide to form a vapor bubble in said liquid of said core layer, said heat-generating means being positioned externally of said optical waveguides and including a plurality of elongated heating members crossing a longitudinal direction of said optical waveguides, means for selectively heating said heating members, said selective heating means being positioned externally of said optical waveguides, means for causing light to be incident on said waveguide along said longitudinal direction and cooling means for eliminating said vapor bubble.

3. An optical device comprising an optical waveguide panel having optical waveguide channels comprising core layers formed by filling a transparent liquid having a relatively high refractive index in parallel channels formed in a combined clad layer of a relatively low refractive index obtained by adhering a transparent flat clad layer having stripe-shaped grooves in a surface therein and a flat clad layer, heat-generating means for heating a part of said core layer to form a vapor bubble in said liquid of said core layer, said heat-generating means being positioned externally of said waveguide channels and including a plurality of elongated heating members crossing a longitudinal direction of said waveguide channels, means for selectively heating said heating members, said selective heating means being positioned externally of said waveguide channels, means for causing light to be incident on said waveguide channel along said longitudinal direction and cooling means for eliminating said vapor bubble.

4. An optical apparatus comprising an optical waveguide having, as a basic unit, a core layer of a liquid having a relatively high refractive index and a clad layer having a relatively low refractive index and covering said core layer, heat-generating means for heating a part of said core layer to form a vapor bubble in said liquid of said core layer, a light source for supplying light to said optical waveguide, cooling means for eliminating said vapor bubble and a light diffusion layer on a light emission side.

5. The optical apparatus according to claim 4, further comprising a row-axis drive circuit and a column-axis drive curcuit.

6. The optical apparatus according to claim 5, wherein the row-axis drive circuit is a circuit for selecting said optical waveguide to guide light and the column-axis drive circuit is a circuit for selecting said heat-generating means.

7. The optical apparatus according to claim 6, wherein said heat-generating means is a heating resistor.

8. The optical apparatus according to claim 4, wherein said light source is a light-emitting diode.

9. The optical apparatus according to claim 4, wherein said light source is laser beam.

* * * * *